Sept. 27, 1949.    J. L. FULLER    2,483,090

PHASE SHIFT CONTROL SYSTEM

Filed March 26, 1945

INVENTOR.
John L. Fuller
BY
Straddling and Kroost
attys.

Patented Sept. 27, 1949

2,483,090

UNITED STATES PATENT OFFICE 2,483,090

PHASE SHIFT CONTROL SYSTEM

John L. Fuller, Cleveland, Ohio, assignor to The Reliance Electric & Engineering Company, a corporation of Ohio Application March 26, 1945, Serial No. 584,985

6 Claims. (Cl. 323—123)

My invention relates in general to a control system and more particularly to a phase shift control system for operating an electrical device requiring voltage phase shift.

An object of my invention is the provision of a voltage phase shift system which gives a relatively large voltage phase shift as the result of a small change in one or more of the electrical circuit constants of the system.

Another object of my invention is the provision of a voltage phase shift system having at least two circuits to give a resultant voltage therebetween which will change rapidly in phase angle as compared to the phase angle change of an individual circuit.

Another object of my invention is the provision of a voltage phase shift system having a bridge circuit to give a resultant voltage which will change rapidly in phase angle as compared to the phase angle change of an arm or branch of the bridge circuit.

Another object of my invention is the provision of a voltage phase shift system having at least two circuits with output connection means to give a resultant voltage therebetween, the voltage at one of said connection means being maintained relatively close to the voltage at the other connection means and being variable through a locus with reference to the voltage at the other connection means.

Another object of my invention is the provision of a voltage phase shift system having at least two circuits to give slightly different voltage loci, the voltage between the loci changing rapidly in phase as compared to the phase angle change of an individual circuit.

Other objects and a fuller understanding of my invention may be had by referring to the following description and claims, taken in conjunction with the accompanying drawing, in which:

Figure 1:
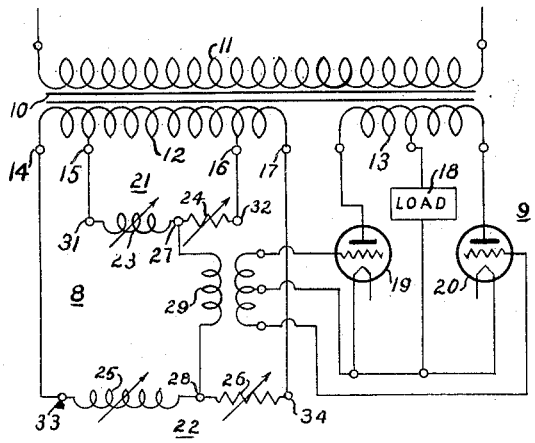
Figure 1 is a diagrammatic illustration of my voltage phase shift system which is shown in conjunction with a grid controlled rectifier circuit.

With reference to Figure 1, my voltage phase shift system is indicated by the reference character 8 and is shown in conjunction with a grid controlled rectifier circuit 9. Any suitable type of grid controlled rectifier circuit may be used with my voltage phase shift system and the one shown in the drawings is merely illustrative. As illustrated, the grid controlled rectifier circuit 9 may comprise two grid controlled rectifier tubes 19 and 20 which are adapted to supply full wave rectified current to a load 18.

Both the voltage phase shift system 8 and the grid controlled rectifier circuit 9 receives electrical energy from a transformer 10 having a primary winding 11 which may be energized from any suitable alternating current source. The transformer 10 is provided with a secondary winding 12 which excites the voltage phase shift system 8 and a secondary winding 13 which supplies energy to the grid controlled rectifier circuit 9. The secondary winding 12 is provided with two end connections 14 and 17 and two intermediate tap connections 15 and 16. A first circuit indicated generally by the reference character 21 is connected across the intermediate tap connections 15 and 16. The first circuit 21 comprises end connections 31 and 32 and an intermediate output connection 27. A variable inductance element 23 is connected between the end connection 31 and the intermediate output connection 27 and a variable resistance element 24 is connected between the intermediate output connection 27 and the end connection 32. The two end connections 31 and 32 are connected respectively to the intermediate tap connections 15 and 16 of the secondary winding 12 of the transformer 10. A second circuit indicated generally by the reference character 22 is connected across the end connections 14 and 17 of the secondary winding 12 of the transformer. The second circuit comprises two end connections 33 and 34 and an intermediate output connection 28. A variable inductance element 25 is connected between the end connection 33 and the intermediate output connection 28 and a variable resistance element 26 is connected between the intermediate output connection 28 and the end connection 34. The two end connections 33 and 34 of the second circuit are connected respectively to the end connections 14 and 17 of the secondary winding 12 of the transformer 10. Mounted between the two intermediate output connections 27 and 28 is a grid transformer 29 adapted to excite the grids of the rectifier tubes 19 and 20. The voltage phase shift system indicated by the reference character 8 and comprising the first and second circuits 21 and 22 is essentially a bridge circuit with the first and second circuits constituting arms or branches of the bridge.

Figure 2:
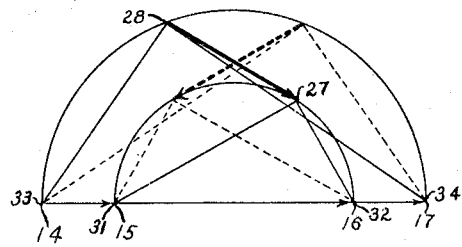
Figure 2 is a vector diagram of the voltage phase shift system shown in Figure 1.

The secondary winding 12 provides related voltages at the connections 14, 15, 16 and 17 with the same phase angle as shown in Figure 2. For example, the voltage from 14 to 15 is represented by a vector in Figure 2 from 14 to 15. Likewise, the voltage from 14 to 16 is represented by a similar vector of greater length but lying on the same straight line. The voltage which is impressed upon the first circuit 21 is represented by the vector lines 15 to 16 and the voltage which is impressed upon the second circuit 22 is represented by the vector line 14 to 17. By varying the relative values of the inductance element 23 and the resistance element 24, the voltage at the output connection 27 of the first circuit defines a semi-circle which has as its diameter a line between the points 15 and 16 of Figure 2. Similarly, by varying the relative values of the inductance element 25 and the resistance element 26 of the second circuit, the voltage at the output connection 28 defines a semi-circle which has as its diameter a line between the points 14 and 17 of Figure 2. In other words, the loci of the voltage at the output connection 27 and at the output connection 28 define two semi-circles as shown in Figure 2. For a condition indicated by the solid vector lines in Figure 2, the voltage between the output connections 28 and 27 is represented by the vector drawn between the points 28 and 27. By increasing the reactance drop across the inductance element 25 and decreasing the reactance drop across the inductance 23 the vectors may assume a position indicated by the dotted lines. It is noted that the vector of voltage between the output connections 27 and 28 has revolved clockwise more than 90 degrees which is more than enough to give adequate control on the rectifying tubes 19 and 20 through the grid transformer 29. With my phase shift circuit, the voltage between the output connections 27 and 28 which is a resultant voltage between the first and second circuits 21 and 22 changes rapidly in phase angle as compared to the phase angle change of an individual circuit. That is to say, I am able to obtain a relatively large phase shift by a relatively small change in one or more of the electrical circuit constants. The sensitivity of the control is determined by the relationship of the connections on the secondary winding 12 of the transformer and by the constants of the inductance element and the resistance element. For high sensitivity the locus of the voltages of the output connections 27 and 28 are made relatively close to each other, because under this condition a small change in the phase angle of one of the individual circuits 21 or 22 will produce a big change in the phase angle of the resultant voltage between the output connections 27 and 28. When only one circuit is changed in phase angle, the resultant voltage swings about a reference voltage point. Thus, for example, if the circuit 21 remains fixed and the circuit 22 is made variable, the locus of the voltage of the connection 27 is a point and the locus of the voltage of the connection 28 is a curved line, being a portion of the outer semi-circle in Figure 2. For high sensitivity the portion of the outer semi-circle which constitutes a voltage locus of the output connection 28 is made relatively close to the reference point on the inner semi-circle, being the locus of the voltage of the output connection 27 about which the resultant vector swings as the circuit 22 is varied.

Figure 3:
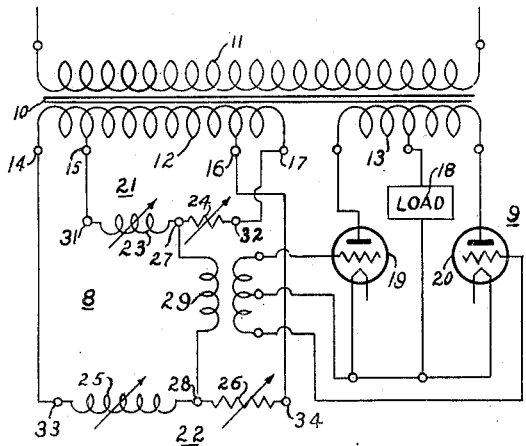
Figure 3 is a modified form of the invention shown in Figure 1.
Figure 4:
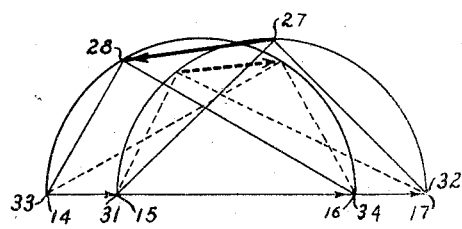
Figure 4 is a vector diagram of the voltage phase shift system shown in Figure 3.

In Figure 3, I show a modified form of the invention shown in Figure 1, in that the end connection 32 of the first circuit 21 is connected to the end connection 17 of the transformer winding 12 and the end connection 34 of the second circuit 22 is connected to the intermediate tap connection 16 of the transformer winding 12. In other words, the end connections 32 and 34 of Figure 3 are just the reverse from the showing in Figure 1. As illustrated in Figure 4 which is a diagrammatic vector representation of the circuit in Figure 3, the voltage loci of the output connections 27 and 28 are displaced laterally with the result that the two semi-circles intersect each other. With this embodiment of the invention as shown in Figure 3, a very rapid change of approximately 180 degrees in phase shift may be obtained on the grid voltage. A modified change in phase angle is obtained by choosing constants such that the points 27 and 28 remain on the same side of the point where the loci curves across one another.

Figure 5:
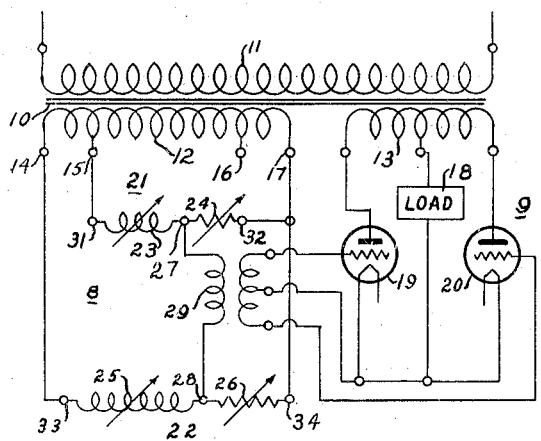
Figure 5 is a further modified form of my invention.

In Figure 5, I show a further modified form of my invention in that the end connections 32 and 34 are both connected to the end connection 17 of the transformer winding 12. This modified form of the invention also may give a very rapid change of approximately 180 degrees in phase shift on the grid voltage.

Figure 6:
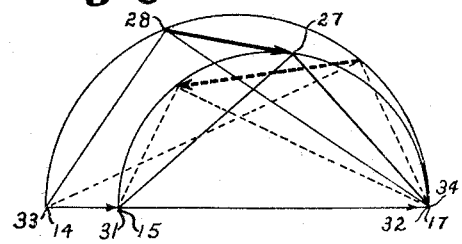
Figure 6 is a vector diagram of the circuit shown in Figure 5.

The Figure 6 shows a vector diagram for the circuit of Figure 5, and here it is noted that the two semi-circles meet each other at their right-hand end in Figure 6.

Figure 7:
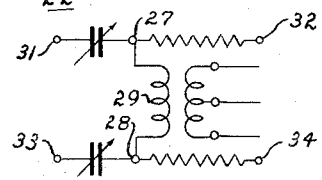
Figure 7 is a fragmentary view showing the use of capacitors instead of inductances for my voltage phase shift system.

With my invention, almost any degree of sensitivity in phase shift may be obtained by proper choice of circuit constants. It is to be noted that control is obtainable by varying only one element of the circuit, such as inductance element 23 or by varying two or more elements simultaneously. It is to be understood that whereas the circuits in Figures 1, 3 and 5 have been shown with variable inductance elements and variable resistance elements, a similar series of circuits may be constructed in which the variable inductance elements are exchanged for capacitors as shown in Figure 7. It is also to be understood that changes in the reactance, the resistance or the capacitance elements may be brought about by several means. However, for the purpose of my invention the electrical elements are shown as being variable which includes any method of making these elements variable.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

What is claimed is:

1. An electrical system for operating an electrical device having first and second elements requiring a voltage phase shift therebetween, said system comprising a transformer having a winding with at least one end terminal, an intermediate terminal and a third terminal, said transformer energizing said first element of said electrical device, a first circuit having a reactive element and a resistive element connected in series, a second circuit having a reactive element and a resistive element connected in series, at least one of said reactive and resistive elements being variable, said first and said second circuit each having an output connection at the juncture of said reactive and resistive elements for supplying a voltage shiftable in phase relative to said transformer winding to said second element of said electrical device, means for connecting said first circuit across said end terminal and said third terminal of said transformer winding, and means for connecting said second circuit across said intermediate terminal and a transformer winding terminal having a potential relative to said end terminal at least as large as said third terminal.

2. An electrical system for operating an electrical device having first and second elements requiring a voltage phase shift therebetween, said system comprising a transformer having a winding and energizing said first element of said electrical device, said winding having an end terminal, having a first terminal spaced from said end terminal, and having a second terminal spaced from said end terminal a greater distance than said first terminal, first and second circuits each having a reactive and a resistive element connected in series, means for connecting one end of said first circuit to said end terminal, means for connecting the other end of said first circuit to said second terminal, means for connecting one end of said second circuit to said first terminal, and means for connecting the other end of said second circuit to said transformer winding at a point spaced from said end terminal a distance at least as great as said second terminal, at least one of said reactive and resistive elements being variable, said first and second circuits each having an output connection at the juncture of said reactive and resistive elements for supplying a voltage shiftable in phase relative to said transformer winding to said second element of said electrical device.

3. An electrical system for operating an electrical device having first and second elements requiring a voltage phase shift therebetween, said system comprising a transformer having a transformer winding including first and second end terminals and first and second intermediate terminals, said transformer energizing said first element of said electrical device, a first circuit including a phase shift element and having first and second end connections and an output connection therebetween, said first and second end connections of said first circuit being connected respectively with the first end terminal and the second intermediate terminal of the transformer winding, and a second circuit including a phase shift element and having first and second end connections and an output connection therebetween, said first and second end connections of said second circuit being connected respectively with the first intermediate terminal and the second end terminal of the transformer winding, said output connections supplying a voltage shiftable in phase relative to said transformer voltage for controlling said second element of said electrical device, at least one of said phase shift elements being variable.

4. An electrical system for operating an electrical device having first and second elements requiring a voltage phase shift therebetween, said system comprising a transformer having a transformer winding including first and second end terminals and first and second intermediate terminals, said transformer energizing said first element of said electrical device, a first circuit having first and second end connections and an intermediate output connection and including a reactive element connected between the first end connection and the intermediate output connection thereof and a resistive element connected between the intermediate output connection and the second end connection thereof, said first and second end connections of said first circuit being connected respectively with the first end terminal and the second intermediate terminal of the transformer winding, and a second circuit having first and second end connections and an intermediate output connection and including a reactive element connected between the first end connection and the intermediate output connection thereof and a resistive element connected between the intermediate output connection and the second end connection thereof, said first and second end connections of said second circuit being connected respectively with the first intermediate terminal and the second end terminal of the transformer winding, at least one of said reactive and resistive elements being variable, said intermediate output connections supplying a voltage shiftable in phase relative to said transformer voltage for controlling said second element of said electrical device.

5. An electrical system for operating an electrical device having first and second elements requiring a voltage phase shift therebetween, said system comprising a transformer having a transformer winding including first and second end terminals and an intermediate terminal, a first circuit including a phase shift element and having first and second end connections and an output connection therebetween, said first and second end connections of said first circuit being connected respectively with the first and second end terminals of the transformer winding, and a second circuit including a phase shift element and having first and second end connections and an output connection therebetween, said first and second end connections of said second circuit being connected respectively with the intermediate terminal and the second end terminal of the transformer winding, at least one of said phase shift elements being variable, said intermediate output connections supplying a voltage shiftable in phase relative to said transformer voltage for controlling said second element of said electrical device.

6. An electrical system for operating an electrical device having first and second elements requiring a voltage phase shift therebetween, said system comprising a transformer having a transformer winding including first and second end terminals and an intermediate terminal, said transformer energizing said first element of said electrical device, a first circuit having first and second end connections and an intermediate output connection and including a reactive element connected between the first end connection and the intermediate output connection thereof and a resistive element connected between the intermediate output connection and the second end connection thereof, said first and second end connections of said first circuit being connected respectively with the first and second end terminals of the transformer winding, and a second circuit having first and second end connections and an intermediate output connection and including a reactive element connected between the first end connection and the intermediate output connection thereof and a resistive element connected between the intermediate output connection and the second end connection thereof, said first and second end connection of said second circuit being connected respectively with the intermediate terminal and the second end terminal of the transformer winding, at least one of said reactive and resistive elements being variable, said intermediate output connections supplying a voltage shiftable in phase relative to said transformer voltage for controlling said second element of said electrical device.

JOHN L. FULLER.

REFERENCES CITED

The following references are of record in the file of this patent:

UNITED STATES PATENTS

| Number | Name | Date |
| --- | --- | --- |
| 1,719,866 | Alexanderson | July 9, 1929 |
| 1,911,051 | Bedford | May 23, 1933 |
| 2,229,968 | Garman | Jan. 28, 1941 |